Feb. 24, 1948.   R. J. HOSTETTER   2,436,513
LUBRICATING SYSTEM FOR INTERNAL COMBUSTION ENGINES
Filed July 17, 1942
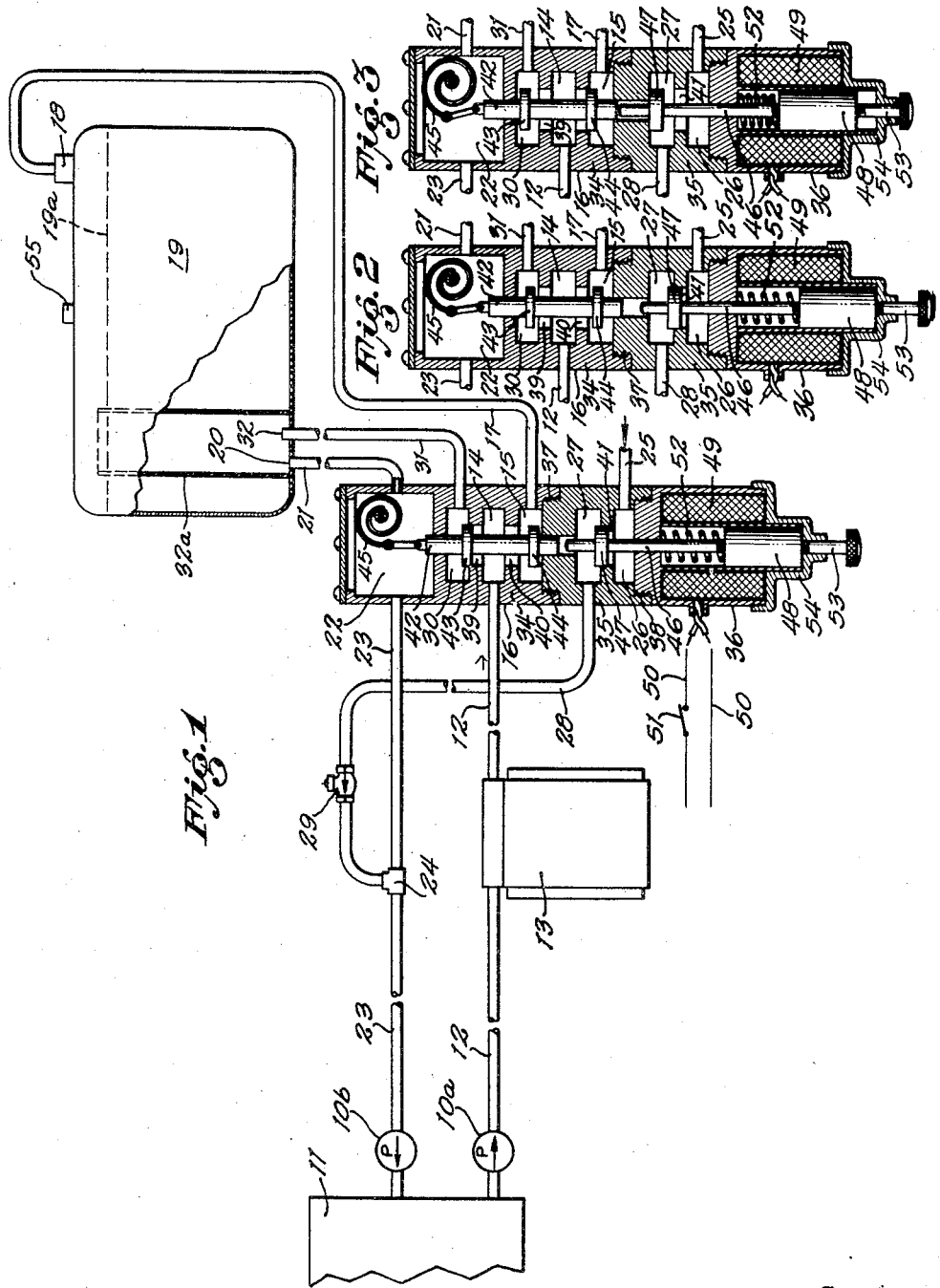
Inventor,
ROBERT J. HOSTETTER
By
Attorney Patented Feb. 24, 1948

2,436,513

UNITED STATES PATENT OFFICE 2,436,513

LUBRICATING SYSTEM FOR INTERNAL-COMBUSTION ENGINES

Robert J. Hostetter, Los Angeles, Calif., assignor to The Garrett Corporation, Airesearch Manufacturing Company Division, Inglewood, Calif., a corporation of California Application July 17, 1942, Serial No. 451,252

14 Claims. (Cl. 123—196)

This invention relates to a lubricating system for an internal combustion engine and is especially adapted for use with the power plant of an aircraft.

When, after a period of non-use the oil between the closely fitted wearing surfaces of pistons, cylinders and bearings of this type of engine has become cold, resistance to starting is experienced by reason of the high viscosity of the cold oil film on the moving parts of the engine. One means of overcoming this difficulty, often referred to as "hard starting," has been by the introduction into the oil stream returning to the engine of a quantity of the fuel gasoline which supplies motive energy to the engine, for a period of a few minutes prior to stopping the engine. The gasoline thus introduced into the lubricating system dilutes the oil and lowers its viscosity so that when the engine is again started after the oil has become cold, no difficulty will be experienced in turning the engine over at a speed proper for starting its operation.

While the introduction of gasoline into the lubricating system solves the problem of starting a cold engine, it creates another problem. When the diluted oil becomes heated to the normal operating temperature of the engine, it does not have sufficient viscosity for proper lubrication. The gasoline which has been added to the oil eventually evaporates in the crank case of the engine and passes in vapor form through the engine breather. Until the evaporation has completed, however, the engine is not being properly lubricated.

It is one object of this invention to shorten the period of evaporation of the gasoline from the lubricant in the circulating system after the cold engine has been started.

The lubricating system of the standard kind includes an oil reservoir or tank into which hot oil is delivered from the engine and from which oil is returned to the engine. It is an object of this invention to provide a lubricating system for an internal combustion engine in which the period of evaporation of an admixture of gasoline or other diluent lubricant to the oil is shortened by reducing the volume of the circulating oil of the lubricating system during the period of introduction of gasoline into the oil prior to stopping the engine, and thereby reducing the quantity of gasoline added to the system which must later be evaporated. This is done by providing for bypassing the main body of the oil in the oil tank or other reservoir while gasoline is being introduced into the oil. Gasoline is thereby prevented from entering the tank at the time the gasoline is being introduced into the lubricant line.

It is another object of the invention to provide a lubricant system for an internal combustion engine in which the period of evaporation of the gasoline from the lubricant is shortened by decreasing the volume of the circulating lubricant after the engine has been started, through the use of a bypassage, and especially a bypassage which short circuits the oil tank, until the oil has been raised in temperature to its normal operating value.

It is another object of the invention to provide a circulating lubricant system for an internal combustion engine having an automatic temperature control for excluding oil from the tank until it has attained normal operating temperature and having means for introducing a diluent lubricant into the oil stream prior to stopping the engine, in which provision is made for bypassing the main body of oil in the tank during the period of introducing the gasoline irrespective of the temperature of the oil at the time of the introduction. It is more specifically the object of the invention to provide a lubricating system of the character described in which the means for opening the flow of gasoline into the lubricant line shall override a thermostatically controlled valve for opening and closing the bypassage in a manner to insure the opening of the bypassage whether the temperature of the oil stream is above or below the predetermined value at which the thermostat is set to operate the bypassage valve.

In lubricating systems for internal combustion engines in which an open or vented reservoir tank forms a part of the circulatory path travelled by the oil, it is usually desirable for one or more reasons to provide means for bypassing the main body of oil in the reservoir under certain conditions of operation. It is also usual when an open or vented reservoir tank is employed to provide a pump for withdrawing oil from the engine and a second pump in the return side of the circulatory system for forcing the oil back into the engine the pumps and vented tank determining the fluid pressures of the system. It is an object of the invention to provide a lubricating system in which a bypassage means of simple inexpensive construction is combined with the reservoir in such a manner as to subject the bypassage to the same fluid pressures existing in the main line to the tank when the oil passes through the tank and which shall provide for escape of air which may be entrained in the oil flowing through the bypassage. More specifically it is an object of the invention to provide a bypassage means of this character by including in the bypassage a small portion of the tank preferably combined with means such as baffle walls to limit circulation through the tank of the oil flowing through the bypassage.

It is another object of the invention to provide a lubricant system for an internal combustion engine in which a bypassage of the character last described is combined with a thermostatic bypassage control to ensure a rapid warming of cold oil and is also combined with both such a thermostatic control and an overriding control which becomes operative when a diluent lubricant is being introduced into the returning oil stream for opening the bypassage during the time of introduction of the diluent lubricant.

Other objects and advantages of the invention will appear from the following description thereof, from the accompanying drawing and from the claims.

In the drawing which is for illustrative purposes only,

Fig. 1 is a schematic representation of a lubricant system for an internal combustion engine in which the invention is embodied.

Figs. 2 and 3 are schematic views of the valve device of the invention similar to the showing of the valve device in Fig. 1, the moving parts of the valve device being shown in two different positions, each different from that shown in Fig. 1.

Referring to Fig. 1 and having in mind that all of the objects and parts of the system are shown schematically, an internal combustion engine is designated by the numeral 11. Lubricating oil leaving the engine is caused by a pump 10a to flow through the delivery piping 12 to a valve housing 16 where it passes through an oil inlet valve chamber 14 and an oil outlet valve chamber 15, to piping 17 by which it is conducted to an oil tank 19 entering the tank through an oil tank inlet 18. A thermostatically regulated oil cooler 13 may be disposed along the delivery piping 12 and connected to have the oil pass through its cooling chamber.

Oil returns from the tank 19 to the engine 11 through an oil tank outlet 20 into a piping 21 through a thermostat chamber 22 in the upper end of the valve housing 16 and thence by the return piping 23 to the engine, the pump 10b providing a forced flow of the oil from the tank 19 to the engine.

A T connection 24 or any other kind of fitting suitable for the purpose is interposed in the return piping 23 for the purpose of introducing into the returning oil stream a diluting lubricant which, as a matter of convenience, is preferably the gasoline or other motive fuel which supplies energy to the engine and is of lower viscosity than the lubricating oil. Gasoline or other low viscosity fuel flows from the source of fuel supply to the T fitting 24 through a fuel line 25, fuel inlet valve chamber 26 in the valve housing 16, fuel outlet valve chamber 27, and fuel line 28, a check valve 29 being connected in the fuel line 28 to prevent lubricant from moving into the fuel conduit system from the return piping 23.

Provision is made for bypassing the main portion or chamber of the oil tank 19 through bypassage piping 31 into which oil may flow from the oil inlet valve chamber 14 through bypassage inlet valve chamber 30 and from which it flows through bypassage outlet 32 into the tank 19 through the bottom wall thereof. A cylindrical foraminous baffle wall 32a extends upwardly from the bottom wall of tank 19 to an upper level which is preferably near the top of the tank. The bypassage outlet 32 and oil tank outlet 20 lie in the portion of the bottom wall of the tank which is enclosed by the baffle wall 32a. Oil entering the tank 19 from the bypassage piping 31 is prevented by the baffle wall 32a from circulating in the main portion of the chamber of the tank 19 and it is withdrawn from the tank 19 immediately after its entrance therein through the outlet 20 which is adjacent the outlet 32 and into the return piping 21 and 23 by the action of the pump 10b. While therefore oil flowing through the bypassage piping 31 moves for a short distance and for a short period of time through the tank 19, it does not pass through the main tank chamber nor does it becomes commingled with the oil in the main tank chamber. The inclusion however of a very short distance within the tank between closely spaced openings, one an outlet and one an inlet, in the travel path of the bypassage oil stream, provides that the fluid pressure within the bypassage piping will not become excessive, being dependent upon the tank fluid pressure and provides that air or other gaseous material entrained in the oil stream of the bypassage piping 31 will have opportunity to escape into the tank. The tank 19 has a vent 55 by which oil pressure at the surface level 19a of the oil inlet tank is kept at approximately atmospheric value and by which air or other gaseous material above the surface level 19a may escape to the atmosphere.

In the operation of the lubricating system oil flows at all times from the engine to the valve housing 16 and from the oil tank outlet 20 to the engine. Under some conditions it flows from the valve housing 16 to the tank 19 through the piping 17 and at other times through the bypassage piping 31 but at no time is flow through both piping 17 and bypassage piping 31 simultaneously halted. Oil from the oil delivery piping 12 enters the oil inlet valve chamber 14 of the valve housing 16 and flows from the chamber 14 either into the piping 17 or the piping 31 as determined by valve mechanism in the upper portion of the valve housing 16. The valve housing and the valve devices mounted therein are shown schematically and may have any suitable structural character. As suggested in the schematic drawing, the housing 16 may comprise an upper cylindric block 34, a middle cylindric block 35, and a lower cylindric block 36 having threaded connections at 37 and 38 to form a continuously cylindric housing, the blocks being cast and cored to provide valve chambers 30, 14, 15, 27, and 26 and machined to provide a valve passage 39 connecting valve chambers 30 and 14, a valve passage 40 connecting valve chambers 14 and 15, and a valve passage 41 connecting valve chambers 27 and 26, as well as to provide connecting passages between valve chamber 30 and bypassage piping 31, valve chamber 14 and oil delivery piping 12, valve chamber 15 and piping 17, valve chamber 27 and fuel line piping 28, and valve chamber 26 and fuel line piping 25.

Oil is directed from delivery piping 12 to the piping 17 leading to the tank 19 or to bypassage piping 31 also leading to the tank 19 according to the position longitudinally of the housing of a valve stem 42 carrying the bypassage valve 43 and a delivery piping valve 44 which are reciprocally movable in the valve passages 39 and 40 respectively, and are spaced so that when the valve stem 42 occupies a lowermost position, as shown in Fig. 1, valve passage 39 is closed and valve passage 40 is open allowing flow of oil from the delivery piping 12 to the piping 17. As the valve stem 42 moves upwardly the valve 44 moves toward the lower end of the valve passage 40 and the valve 43 begins to open the valve passage 39 as shown in Fig. 2. As the valve stem 42 continues its upward movement, the valve passage 39 is provided with a progressively greater opening into the valve chamber 30 while at the same time the opening from the valve passage 40 into the valve chamber 15 is progressively decreased. During this period in which one valve is being closed and the other opened the rate of flow of oil through the delivery piping valve is substantially constant, but the rate of flow of oil through the piping 17 gradually decreases while at the same time the rate of flow of oil in the bypassage 31 increases. While the valve stem 42 reaches its uppermost position the valve passage 40 is completely closed and all of the oil flowing through the delivery piping 12 passes into the bypassage piping 31 as shown in Fig. 3.

Movement of the valve stem 42 is controlled by a thermostat 45, the live end of which is connected to the upper end of the valve stem 42, the upper and lower ends of the valve stem 42 having a sliding fit in an upper wall of the upper cylindric block 34 and the upper wall of the cylindric block 35 respectively. The thermostat 45 is mounted in the thermostat chamber 22 formed in the upper end of the upper cylindric block 34. As thus positioned the thermostat is always responsive to the oil returning to the engine whether it reaches the tank through the piping 17 or the bypassage piping 31. The thermostat is set so that when the temperature of the oil is above a predetermined value the valve stem 42 is positioned as shown in Fig. 1 to direct a flow of oil from the delivery piping 12 to the piping 17. When the temperature of the oil in the chamber 22 drops below the predetermined value the valve stem 42 is positioned by the thermostat so as to direct oil from the delivery piping 12 to the bypassage piping 31. When the oil flows through the bypassage piping 31 the volume of the circulating fluid is greatly decreased and the heating of the lubricant is effected at a more rapid rate.

The valve housing 16 also carries the valve mechanism for controlling the introduction of lubricant diluent of low viscosity into the oil line at 24. The fuel line valve control mechanism comprises a valve stem 46 slidably mounted in the lower cylindric block 36 in a position coaxial with the valve stem 42, and a valve 47 carried by the valve stem 46 which when the valve stem is in an upper position opens the valve passage 41 for the flow of the fuel gasoline from fuel line 25 to fuel line 28 through the valve chambers 26 and 27. When the valve 47 is lowered as the valve stem 46 assumes a lowermost position, it is situated so as to close the valve passage 41 shutting off flow of gasoline, as shown in Fig. 1. Movement of the valve stem 46 is controlled by an electromagnet 49 and an armature 48 on the valve stem in combination with the helical spring 52, the energization of the electromagnet by operation of the manual switch 51 to close the circuit 50 serving to move the valve stem 46 upwardly to open the valve passage 41, as shown in Fig. 3, and the spring 52 serving to return the valve stem 46 to its lower position closing the valve passage 41 when the switch 51 is opened deenergizing the electromagnet 49. The manual pusher 53 slidable in the cap 54 may be provided for hand operation of the valve stem 46 in lieu of the electric operation thereof or in addition thereto if desired.

The upper end of the valve stem 46 when the valve stem is in its uppermost position abuts the lower end of the valve stem 42 holding the latter in its uppermost position. If when the fuel valve stem 46 is moved upwardly the oil valve stem 42 is in its uppermost position, the fuel valve stem 46 assumes a position where it prevents movement downwardly of the oil valve stem 42. If the valve stem 42 is in a lower position at a time when the valve stem 46 is moved upwardly, the upper end of the valve stem 46 engages the lower end of the valve stem 42 and the two valve stems move upwardly together, and this even though the thermostat 45 at such a juncture opposes this upward movement. The longitudinally acting force of the electromagnet 49 exceeds the opposing longitudinally acting force of the thermostat 45.

In the operation of the lubricating system of the invention, assuming that the engine is in operation and has been in operation for some time, oil flows from the oil delivery piping to the tank 19 through the piping 17 or through the bypassage piping 31 into the space in the tank 19 enclosed within the baffle wall 32a in response to the action of the thermostat 45 as has been previously explained. If a thermostatically controlled cooler 13 is a part of the lubricating system, under most conditions of operation the temperature of the returning oil will be sufficiently constant and sufficiently high to maintain the valve stem 42 in its lower position sending the oil from the delivery piping 12 into the piping 17 leading to the top of the tank 19. When the engine is stopped and it is not intended to again operate it for a substantial period of time, the switch 51 is closed a few minutes before the engine is brought to a standstill, the effect of this being to inject a quantity of gasoline into the returning oil stream at the T connection 24 during these few minutes, lowering the viscosity of the oil so that even after the oil has become thoroughly cooled its viscosity is sufficiently low to permit easy starting of the engine. During these few minutes of introduction of gasoline into the lubricating piping, the valve stem 42 is moved into its upper position, see Fig. 3, if it is not already there and is held in that upper position as long as the switch 51 is closed. The effect of this is to bypass the tank 19, greatly decreasing the volume of the circulating lubricant and preventing a mixture of gasoline with the oil in the main portion of the tank chamber.

When the engine is again started after an extended period of idleness, cold oil diluted with gasoline fills the piping 12, the bypassage 31, the thermostat chamber 22, and the return piping 23. The thermostat then will hold the valve stem 42 in its raised position. As the engine warms the oil from cold condition, the gasoline which is mixed with the oil circulating in the crank case of the engine, in the delivery piping 12, bypassage piping 31, return piping 21 and 23 in thermostat chamber 22, is progressively evaporated within the crank case chamber finding its way from the crank case chamber through the engine breather. Since by the time the oil has reached a temperature high enough to cause the thermostat 45 to move the valve stem 42 to its lowered position, the gasoline has been substantially completely evaporated from the oil stream circulating through the shorter bypassage route, no gasoline is carried into the tank when the oil begins to flow through the piping 17 into the upper end of the tank 19. In an oil circulating lubricant system of this invention, it is apparent that the viscosity of the oil may be lowered by the introduction of gasoline prior to shutting down the engine making a lubricant of low viscosity available for starting the engine, without affecting the viscosity of the lubricant in the system when the engine after being again started has reached a normal operating temperature, at which temperature the diluted lubricant would have, if still present in the lubricating system, a dangerously low viscosity.

I claim as my invention:

1. In the lubricating system of an internal combustion engine, the combination of: means for moving a stream of lubricating oil over a circulatory route into and out of the engine, said means including an oil reservoir having a main portion; normally inoperative means for locally introducing a lubricant diluent of low viscosity into the said oil stream between said reservoir and the engine; temperature controlled means bypassing the main portion of said reservoir for establishing a circulatory route exclusive of said main reservoir portion and inclusive of said introducing locus; and independently acting means for synchronously relating the operation of said introducing means and said bypassage means so that the oil stream will pass through said bypassage means during the time of introduction of diluent into said oil stream.

2. In the lubricating system of an internal combustion engine, the combination of: means for moving a stream of lubricating oil over a circulatory route into and out of the engine, said means including an oil reservoir having a main portion; normally inoperative means for locally introducing a lubricant diluent of low viscosity into the said oil stream between said reservoir and the engine; normally closed valved means bypassing the main portion of said reservoir for establishing a circulatory route exclusive of said main reservoir portion and inclusive of said introducing locus; means responsive to the temperature of the oil stream at a point between said bypassage means and the engine for operating said bypassage means during periods of low oil temperature; and means for operating said introducing means and said bypassage means in synchronous relation for excluding the diluted lubricant from said main reservoir portion, said last defined means overriding said temperature responsive means.

3. In the lubricating system of an internal combustion engine, the combination of: means for moving a stream of lubricating oil over a circulatory route into and out of the engine, said means including an oil reservoir having a main chamber; normally closed valved means bypassing the main chamber of said reservoir for establishing a circulatory route exclusive of said main reservoir chamber; normally inoperative means for locally introducing a lubricant diluent of low viscosity into the said oil stream between said bypassage means and the engine inlet; means comprising a thermostat disposed in the oil stream at a point between said bypassage means and said introducing means for opening said valved bypassage means during periods of relatively low temperature of the oil at said point; and means for synchronously operating said diluent introducing means and opening the valve of said bypassage means, said last defined means overriding said thermostatic means.

4. The combination defined in claim 3 and in addition thereto: a thermostatically regulated oil cooler along said route between the engine outlet and said bypassage means.

5. In the lubricating system of an internal combustion engine, the combination of: pump and conduit means for moving a stream of lubricating oil over a circulatory route into and out of the engine, said means including an oil reservoir having a portion for containing a main body of oil therein; a bypassage means bypassing the main body of oil in said reservoir portion for establishing a circulatory route exclusive of the main body of oil in said reservoir; a reversibly movable three-way valve for always connecting the outlet conduit of said pump and conduit means selectively with either said bypassage means or said reservoir portion; normally inoperative means for locally introducing a lubricant diluent of low viscosity into the said oil stream between said bypassage means and the engine inlet; means comprising a thermostat disposed in the oil stream between said bypassage means and said engine for operating said valve to connect said engine inlet with said bypassage means or said reservoir portion during periods of temperature of said oil stream below a predetermined value or periods of temperature of said oil stream above a predetermined value respectively; and manually controlled means for operating said diluent introduction means and synchronously, during said operation and in overriding relation to said thermostat, operating said three-way valve to hold open said bypassage means.

6. The combination defined in claim 5 and in addition thereto; a thermostatically regulated oil cooler along said route between the engine outlet and said bypassage means, said three-way valve operating thermostat being disposed between said bypassage means and the engine inlet.

7. The combination defined in claim 5 in which said three-way valve comprises a reciprocably movable valve element permanently connected to be moved in either direction by said valve operating thermostat and separably engaging said diluent introduction operating means for movement thereby only in a direction to open said bypassage means, said diluent introduction operating means applying a stronger moving force than said thermostat to said movable valve element.

8. In the lubricating system of an internal combustion engine, the combination of: pump and conduit means for moving a stream of lubricating oil over a circulatory route into and out of the engine, said means including an oil reservoir having a major chamber; a bypassage means bypassing the major chamber of said major reservoir chamber for establishing a circulatory route exclusive of said major reservoir chamber; a valve housing having an inlet connected to the engine inlet, a first outlet connected to said reservoir chamber and a second outlet connected to said bypassage means; a first valve stem in said housing reciprocably movable between terminal positions; a valve element on said stem at all times providing for said housing inlet, communicating openings of varying magnitudes selectively to said first and second housing outlets in correspondence with the extent of movement of said stem in a first direction or a second direction respectively; normally inoperative means for locally introducing a lubricant diluent of low viscosity into the said oil stream between said bypassage means and the engine inlet; a thermostat disposed in the oil stream between said bypassage means and said engine and connected to said valve stem to correlate movement of said valve stem in said bypassage opening second direction with a decline in oil temperature, the correlation providing that said bypassage second outlet is always closed when the oil temperature is above a predetermined value; and a manually controlled valve device for said diluent introduction means having a movable valve element and a reciprocably moving second valve stem for said valve element, said second valve stem, upon the opening of said valve device, separably engaging said first valve stem when held in bypassage closing position by said thermostat for moving said first stem in said second direction to a position providing a relatively large opening to said second outlet with a thrust force greater than that opposingly exerted by said thermostat.

9. In the lubricating system of an internal combustion engine, the combination of: means for moving a stream of lubricating oil over a circulatory route into and out of the engine, said means including an oil reservoir having a main portion; normally inoperative means for locally introducing a lubricant diluent of low viscosity into the said oil stream between said reservoir and the engine; valved means bypassing the main portion of said reservoir for establishing a circulatory route exclusive of said main reservoir portion and inclusive of said introducing locus; means responsive to the temperature of the oil stream at a point between said bypassage means and the engine for operating said bypassage means during periods of low oil temperature; and means for operating said introducing means and said bypassage means in synchronous relation for excluding the diluted lubricant from said main reservoir portion, said last defined means being independently operable to oppose said temperature responsive means.

10. In the lubricating system of an internal combustion engine, the combination of: a vented oil reservoir; a first oil passage means from the engine to said reservoir; a return second oil passage means from said reservoir to the engine, said first and second passage means communicating with said reservoir at loci spaced to maintain circulation through said reservoir of the oil entering the reservoir from said first oil passage; a bypassage means connecting said first oil passage means with said reservoir at a point adjacent the connection of said second passage means with said reservoir, the communicating connection with the reservoir of said bypassage means and said second passage means being in the bottom wall of said reservoir; an apertured wall means forming a relatively small chamber embracing said communicating connections; temperature responsive valve means for alternately directing oil through said bypassage means or through said first passage means into said reservoir; means causing a circulatory flow of oil in said system; normally inoperative means for introducing a lubricant diluent of low viscosity in said second passage means; and means for synchronously relating the operation of said introducing means and valve means to direct the oil through said bypassage means during the introduction of the lubricant diluent, said means overriding said temperature responsive means.

11. In the lubricating system of an internal combustion engine, the combination of: means for moving a stream of lubricating oil through a circulatory route into and out of the engine, including an oil reservoir having a main portion; means bypassing the main portion of said reservoir to establish a circulation exclusive of said main reservoir portion; means to introduce a diluent into said oil stream between the reservoir and the engine; and means controlled by said last means for rendering said bypass means operable to exclude the diluted lubricant from said main reservoir portion when said diluent is being introduced.

12. In the lubricating system of an internal combustion engine, the combination of: an oil reservoir including a main storage chamber and a bypass chamber extending upwardly from the bottom of the reservoir, a common outlet for said chambers communicating directly with said bypass chamber through the bottom of the reservoir, a main inlet communicating with said storage chamber, and a bypass inlet communicating through the bottom of the reservoir with said bypass chamber adjacent said common outlet; means defining a main route for circulation of oil through the engine, said main inlet, said main storage chamber, said bypass chamber, and said common outlet; means for converting said main route into a shortened route for circulation of the oil through the engine, said bypass inlet and thence directly to said common outlet; and means to introduce a diluent into said shortened route.

13. A lubricating system as defined in claim 12, including thermostatic means, sensitive to the temperature of oil flowing in a common portion of said circulatory routes for apportioning the normal flow of oil between said main route and said shortened route; and means operable to control said diluent introducing means and to over-control said thermostatic means in a manner to simultaneously effect the exclusion of oil from said main circulatory route and fully establish said shortened route and effect the admission of diluent thereinto.

14. A lubricating system as defined in claim 12, including thermostatic means, sensitive to the temperature of oil flowing in a common portion of said circulatory routes for apportioning the normal flow of oil between said main route and said shortened route; and manually controlled means operable to control said diluent introducing means and to over-control said thermostatic means in a manner to simultaneously effect the exclusion of oil from said main circulatory route and fully establish said shortened route and effect the admission of diluent thereinto.

ROBERT J. HOSTETTER.

REFERENCES CITED

The following references are of record in the file of this patent:

UNITED STATES PATENTS

| Number | Name | Date |
|---|---|---|
| 1,874,605 | Page | Aug. 30, 1932 |
| 1,977,877 | Handy | Oct. 23, 1934 |
| 2,021,282 | Blanchard | Nov. 19, 1935 |
| 2,107,188 | Ryder | Feb. 1, 1938 |
| 2,133,394 | Mortier | Oct. 18, 1938 |
| 2,188,801 | Worth | Jan. 3, 1940 |
| 2,311,069 | Miller | Feb. 16, 1943 |

FOREIGN PATENTS

| Number | Country | Date |
|---|---|---|
| 330,053 | Great Britain | June 5, 1930 |